United States Patent Office 3,312,640
Patented Apr. 4, 1967

3,312,640
COLLOIDAL CLAY COATED WITH ACRYLIC ACID-POLYALLYL SUCROSE COPOLYMER
Thomas H. Ferrigno, Metuchen, N.J., assignor to Minerals & Chemicals Philipp Corporation, Menlo Park, N.J., a corporation of Maryland
No Drawing. Filed May 21, 1963, Ser. No. 282,129
13 Claims. (Cl. 260—17.4)

This invention relates to a novel combination of colloidal materials for thickening aqueous liquids and to a method for thickening aqueous liquids therewith. This invention relates especially to a composite particulate thickening agent including the combination of a long chain crosslinked vinyl carboxylic polymer and, as a solid and active carrier therefor, particles of the colloidal form of attapulgite clay.

High molecular weight crosslinked vinyl carboxylic polymers, such as polyacrylic acid crosslinked with polyallyl sucrose, are hydrophilic colloids. These polymers are useful as thickening agents for aqueous liquids. The acid form of the high polymer is agitated mildly in water and, upon controlled neutralization of the acid polymer in the aqueous reaction medium, highly viscous aqueous systems are produced. One limitation to the use of in situ formed polycarboxylic polymer salts in thickening aqueous liquid is that the polymers are not effective for such purpose in hard water. Divalent metallic cations, such as calcium ion and magnesium ion, form an insoluble salt with the acid polymer. These polyvalent metallic salts do not possess the unique colloidal properties of monovalent salts of the acid polymer.

The necessity for avoiding divalent metallic cations in aqueous liquids adapted to be thickened with synthetic crosslinked carboxylic polymers limits the use of the polymers to systems in which virtually mineral-free water is employed. Further, the sensitivity of acid polymers or monovalent salts of the polymers to the presence of divalent metallic ions curtails the use of the synthetic polymers in systems which contain appreciable quantities of calcium carbonate or similar pigments. Still another limitation as to the use of these polymers as thickening agent is that the polymers are degraded by high shear agitation. As a consequence, aqueous dispersions of the polymer or salts of the polymer are normally permanently thinned when they are subjected to high shear either during formulation or when they are handled in a pump.

Still another type of colloidal thickening agent is that of the acicular clays, especially the colloidal form of attapulgite clay (Georgia-Florida fullers earth). In contrast with expanding lattice clays, e.g., sodium bentonites, which body aqueous liquids by a swelling and hydration mechanism generally similar to the method by which vinyl carboxylic acid polymers thicken water, colloidal attapulgite clay is a nonswelling clay material and it thickens aqueous liquids by a unique orientation of dispersed colloidally dimensioned acicular crystals in the liquid system. Unlike crosslinked carboxylic polymer thickening agents, colloidal attapulgite clay is not adversely affected by high shear agitation. In fact, high shear agitation, such as the agitation provided by a colloid mill, is required to provide colloidal attapulgite clay dispersions of optimum viscosity. Moreover, attapulgite clay thickened systems are stable in the presence of divalent metallic cations and thus are free from this limitation of vinyl carboxylic polymer thickening agents.

While aqueous attapulgite clay dispersions are free from several detractive features of dispersions of vinyl carboxyl polymers, dispersions of this particular type of colloidal clay are not sufficiently viscous for some applications unless relatively large quantities of clay are used. Furthermore, attapulgite clay dispersions are undesirably thixotropic for some purposes. In other words, the difference in apparent viscosity of an attapulgite clay thickened liquid at low rates of shear and at high rates of shear is excessive for some purposes. As a result, when latex paint formulations are bodied with attapulgite clay the paints may flow to an undesirable degree during brushing. This difficulty is not obviated by incorporating prior art clay flocculants, e.g., lime, into attapulgite clay thickened or bodied aqueous systems to effectuate the thickening property of the clay. Such additives usually have little or no effect upon the high shear viscosity of attapulgite clay thickened or bodied aqueous systems. To the contrary, they usually increase the thixotropy of aqueous attapulgite clay dispersions by bringing about a further increase in the difference between low and high shear viscosity of the clay dispersions.

This invention results from the discovery that the rheological properties of each of colloidal attapulgite clay and a particular type of colloidally dispersible hydrophilic crosslinked vinyl carboxylic polymer, described hereinafter, are mutually benefited when these two different types of colloidal thickening agents are employed conjointly and in a manner set forth hereinafter.

Accordingly, one object of this invention is the provision of method and means for thickening aqueous liquids with a combination of colloidal ingredients in a manner such that the thickened liquid has desirable viscometric properties normally not obtained with either colloidal ingredient employed singly.

Another object of this invention is the provision of compositions for thickening aqueous liquids which are generally more effective for the purpose than either ingredient of the composition when employed singly.

Still another object of this invention is the provision of solid particulate compositions containing a copolymer of acrylic acid and polyallyl sucrose which are less sensitive to the presence of divalent metallic cations and to high shear agitation than said copolymer would be in the absence of said clay.

A more specific object of this invention is the provision of attapulgite clay compositions which, when dispersed in water, produce aqueous systems which are appreciably less thixotropic than attapulgite clay dispersions.

Another object is the provision of a synergistic combination of colloidal thickening agents.

Further objects and features of this invention will be apparent from a description thereof which follows.

Briefly stated, in accordance with this invention, particles of the colloidal form of attapulgite clay are coated with a small amount of a colloidally dispersible polymer of acrylic acid crosslinked with from about 0.75% to about 2.0% by weight, preferably about 1.0% by weight, of polyallyl sucrose having from 5 to 6 allyl groups per sucrose molecule, a minor proportion of free carboxy groups of said crosslinked polymer having been converted to an amine salt by reaction in situ (in the presence of the clay) between a lower alkyl monamine and said crosslinked polymer, whereby the lower alkyl amine salt functions as a substantive agent linking the crosslinked polymer to the clay.

Compositions of this invention are useful as thickening agents for aqueous liquids, especially aqueous liquids formulated with hard water. In thickening aqueous liquids, such as latex paints, with the composite agent of this invention, the clay coated with partial amine salt of crosslinked acrylic acid polymer is agitated in the aqueous liquid, thereby partially thickening the liquid. Thickening is completed by incorporating a water-soluble base, such as a sodium hydroxide or ammonium hydroxide, into the dispersion of coated attapulgite clay. For example, in thickening latex paints, the composite thickening agent can be dispersed directly in the pigment paste since, prior to full neutralization of the polymeric coating, the coated clay is comparatively ineffectual as a thickening agent. When the polymeric coating is neutralized in the thindown, the latex paint formulation is effectively thickened to the desired consistency.

Following are advantages of the coated clay compositions of this invention:

(1) The crosslinked polymer treated clay is not sensitive to hard water as is the crosslinked polymer in the absence of clay.

(2) The treated clay product results in gels that are not degraded by high shear mixing as are gels produced with the crosslinked polymer alone.

(3) The crosslinked polymer and colloidal clay function synergistically, producing higher viscosites than would be expected, especially in hard water.

(4) Aqueous dispersions of the treated clay usually have a lower degree of thixotrophy and a higher low shear viscosity than dispersions containing appreciably greater quantities of attapulgite clay as the sole colloidal thickening agent.

(5) Stiff, nongrainy gels can be made with less than 5% clay concentration.

More specifically, the clay material employed in carrying out this invention contains attapulgite as the predominating mineral species. Attapulgite is a unique hydrated magnesium aluminosilicate mineral composed of chains of silicon tetrahedron linked together by octahedral groups of oxygen and hydroxyls containing aluminum and magnesium atoms. Normally attapulgite clay contains small amounts of quartz and calcite impurities. The presence of such impurities in the clay is not detrimental for purposes of this invention. In fact, removal of coarse or gritty impurities normally present in attapulgite clay (as by wet screening the clay) appears to be undesirable for purposes of this invention. In other words, the use of attapulgite clay containing impurities normally associated with the raw clay, as mined, is recommended.

The term "colloidal attapulgite clay" as used herein refers to a form of attapulgite clay which can be dispersed into particles of colloidal dimensions when sheared in aqueous media. A characteristic of colloidal attapulgite clay is that the clay has never been dried to a free moisture (F.M.) below about 7% since drying of this type of clay to a F.M. appreciably below about 7% irreversibly impairs the colloidal properties of the clay. (The term "free moisture" refers to the weight percentage of a material that is eliminated when the material is heated to essentially constant weight at 220° F.) In producing coated clay products of this invention, extruded colloidal clay is eminently suitable. Attapulgite clay which has a F.M. within the range of about 7% to 10% is preferred as the starting clay although clay having a higher F.M. can be used. While attapulgite clay having a F.M. content as high as 25% or more can be used as a starting material, the use of clay having a F.M. of 7% to 10% is recommended since a drying step can be eliminated when clay having a F.M. of this order is used.

A typical chemical analysis of attapulgite clay, on a volatile free (V.F.) basis (determined at 1800° F.) is as follows:

| | Wt. percent |
|---|---|
| $SiO_2$ | 68.43 |
| $Al_2O_3$ | 12.56 |
| $Fe_2O_3$ | 4.94 |
| MgO | 9.82 |
| CaO | 1.67 |
| $K_2O$ | 0.70 |
| $Na_2O$ | 0.25 |
| $TiO_2$ | 0.60 |
| Others | 1.03 |

The crosslinked acrylic acid polymer ingredient employed in carrying out the instant invention is one which contains from about 98.6 to about 99.0 parts by weight acrylic acid and about 1.0 to about 1.4 parts by weight of a polyallyl sucrose having from 5 to 6 allyl groups per sucrose molecule. The hydrophilic copolymer must be in very finely divided form and should be in the form of particles substantially all of which are minus 325 mesh (Tyler) or 44 microns. In other words, the starting copolymer should be composed of micron sized particles. The required finely divided form of the acid copolymer can be obtained directly as a precipitate by polymerization of a substantially anhydrous monomer mixture in a hydrocarbon liquid which is a solvent for the monomers but is a nonsolvent for the polymer. A solvent soluble peroxide or other so-called "free radical" type catalyst is used. Specific examples of the preparation of suitable copolymers of acrylic acid and polyallyl sucrose are given in U.S. 2,923,692 to Joseph F. Ackerman and John F. Jones.

The quantity of acrylic copolymer added to the clay is within the range of about 1% to 15%, preferably 5% to 10%, of the clay weight, on a moisture-free (M.F.) clay basis. When employed in amount appreciably less than 5%, the copolymer coating tends to decrease in effectiveness. On the other hand, when carboxylic copolymer is employed in amount appreciably greater than 15%, dispersions of the coated clay may possess the undesirable characteristics of the organic polymer in the absence of the clay.

As mentioned, an organic amine must be incorporated with the colloidal clay and acid polymer to form a bond therebetween. Amines useful for the purpose included lower alkyl amines and alkanolamines, each containing from 2 to 4 carbon atoms in a single alkyl group. As examples of suitable amines may be mentioned monoethanolamine, diethanolamine, triethanolamine, diisopropanolamine, diethylamine, isopropylamine, diisoproylamine and n-butylamine.

The quantity of amine employed is sufficient to neutralize from about 1% to 25%, preferably from about 10% to 20%, of the free carboxy groups of the crosslinked acrylic polymer. This quantity, which will vary with the equivalent weight of the amine, can be calculated as follows, assuming an equivalent weight (average molecular weight per combining unit) of 75 for the crosslinked acrylic polymer containing about 1% polyallyl sucrose:

Wt. amine required to neutralize X% of copolymer =
$$\frac{\text{equivalent weight amine}}{75} \times \frac{X}{100}$$

When appreciably less than 10% of the crosslinked polyacrylic acid is neutralized, the cooperative effect of polymer and clay may not be as significant as when 10% or more of the polymer is neutralized. On the other hand, when appreciably more than 20% of the polymer is neutralized, difficulty may be experienced in dispersing the coated clay product in water.

In producing the coated clay product of this invention, the amine employed to neutralize partially the copolymer coating material can be added to the clay in the form of a solution in water, volatile organic solvent or mixture thereof, either before the copolymer is added to the clay or after the copolymer has been added to the clay. Especially good results have been obtained when amine solution was added to the clay before addition of powdered crosslinked acrylic polymer to the clay since the amine solution functions also as an adhesive for the copolymer when used in this manner.

It has been found that attapulgite clay coated with partially neutralized allyl sucrose crosslinked polyacrylic acid is especially effective when the free moisture of the coated clay product is about 18%. The free moisture of the colloidal clay can be adjusted to this level by addition of water. An inert organic solvent, especially mineral spirits, can also be used to adjust the free moisture. Adjustment of free moisture is conveniently and effectively accomplished by controlling the concentration of solvent in the amine solution that is incorporated with the clay.

It is believed that free moisture in the partially neutralized coated clay product is present in channels in the clay crystals, thereby preventing undesirable absorption of the copolymer by the clay with resultant deactivation of the copolymer. The amine treated copolymer coated clay should be ground to about 100% minus 200 mesh (Tyler) before use.

In producing thickened aqueous liquids with the finely divided, free flowing, partially neutralized crosslinked polyacrylic acid coated attapulgite clay product, from about 2% to 15%, more usually from about 5% to 10%, by weight of the coated clay is normally used. As with other attapulgite clay products, the clay product should be sheared with the liquid to effect the required dispersion of the clay. The pH of the dispersion of copolymer coated clay (which is generally within the range of about 4 to 5) is then adjusted to a level of about 7 to 9 by incorporating into the dispersion of copolymer coated clay an inorganic monovalent base such as ammonium hydroxide, sodium hydroxide, sodium carbonate or potassium hydroxide. The use of a weak base, such as ammonia, is preferred since use of excessive quantities of a weak base will not result in the sharp decrease in viscosity that will occur when a comparable quantity of strong base is used in excess. The amount of base employed to thicken the aqueous dispersion of coated clay will depend on several factors including the amount of amine that was employed to improve the substantivity of the crosslinked acrylic acid polymer to the clay, the equivalent weight of the base and the nature of the aqueous phase of the coated clay dispersion. In calculating the quantity of base required to establish a desired pH in coated clay thickened systems, an equivalent weight of 75 for the acrylic acid-polyallyl sucrose copolymer can be used.

While coated clay products of this invention contain colloidal attapulgite clay, copolymer of acrylic acid and polyallyl sucrose, and amine as essential ingredients, it is also within the scope of this invention to incorporate therein other ingredients. For example, an anionic or nonionic wetting agent, such as Aerosol OT, can be included in the composition to increase the dispersion rate of the copolymer coated clay.

In the examples which follow the starting colloidal attapulgite clay was a commercial extruded Georgia-Florida fullers earth thickening agent (Attagel 30). The clay had a V.M. of about 22% and a F.M. of about 12%, as produced, and was 95% minus 325 mesh (Tyler) and 100% minus 200 mesh.

In all examples, the crosslinked acrylic acid polymer was a powdered (minus 44 microns) copolymer of 98.6 to 99.0 parts by weight of acrylic acid and 1.0 to 1.4 parts by weight of a polyallyl sucrose having 5 to 6 allyl groups per sucrose molecule.

All viscosity values refer to values obtained with a Brookfield RVT Viscometer with a #2 spindle. This viscometer measures the torque required to rotate a spindle through a sample at a preselected speed. Apparent viscosity is obtained by multiplying torque dial reading by a suitable instrument constant. All viscometer readings were made on samples having a temperature of about 77° F.

Unless indicated, viscosity measurements were made in systems formulated with tap water from a hard water supply containing about 20 grains per gallon of $CaCO_3$.

EXAMPLE I

*Part A.*—This example illustrates the thickening of latex paint by incorporating partially neutralized crosslinked acrylic acid polymer coated attapulgite clay in the mill paste and neutralizing the coated clay material in the thindown.

In accordance with this invention, 100 parts by weight of a sample of Attagel 30, equilibrated to a F.M. of 7.0%, was tumbled at ambient temperature in an inclined drum with 5.0 parts by weight of the powdered polyallyl sucrose crosslinked acrylic acid polymer. 1.2 parts by weight of mixed isopropanolamines were uniformly sprayed on the polymer coated clay in the form of an aqueous solution of the amines while the coated clay was being tumbled in the drum. The free moisture of the coated clay product was 20.2%. The pH of a 5% aqueous slurry of the product was 5.0.

The latex paint was formulated as follows:

*Morehouse mill paste*

| | Lbs./100 gal. |
|---|---|
| Partly neutralized crosslinked acrylic acid polymer coated attapulgite clay product | 10 |
| Water | 300 |
| Dispersant (Tamol 731, 25% solution) | 12 |
| Ethylene glycol | 16 |
| Antifoam agent | 5 |
| Titanium dioxide pigment (Ti Pure R510) | 200 |
| Kaolin pigment (ASP 400) | 419 |
| Water | 119 |
| Styrene-butadiene latex (Pliolite 100) | 192 |
| 28% aqueous ammonia solution | 1.3 |
| Total | 1274.3 |

TABLE I.—PROPERTIES OF LATEX PAINT THICKENED WITH AMINE-TREATED CROSSLINKED POLYACRYLIC ACID COATED ATTAPULGITE CLAY PRODUCT

Brookfield viscosity, after standing overnight at 77° F. _____ 34,000 cp. at 0.5 r.m.p.; 1,090 cp. at 100 r.p.m.

pH _____ 9.2.

Condition of paint after 2 months age:
  Settling _____ None.
  Brushing property _____ Excellent.
  Film building property _____ Very good.
  Leveling _____ Good.

*Part B.*—The polymer coated attapulgite clay was omitted from the latex paint formulation of Part A. The remaining ingredients were bodied by incorporating 136 pounds per gallon of a 0.5% solution of acrylic acid polymer neutralized to a pH of 8.80 with ammonia and 0.9 pounds per gallon of a 28% ammonia solution in the thindown. The Brookfield viscosity of the resulting latex paint formulation was about 34,000 cp. at 0.5 r.p.m., approximately the same as the 0.5 r.p.m. viscosity of the latex paint of Example I, Part A. The apparent viscosity of the latex formulation of Part B at 100 r.p.m. was only about 68% of the 100 r.p.m. apparent viscosity of the paint of Part A which had been thickened with attapulgite clay coated with amine-treated cross-linked acrylic acid polymer. In other words, the latex formulation of Part A was less thixotropic than the latex paint formulated with the polymer alone. As a consequence, the leveling properties of the paint bodied with polymer coated clay (Part A) was markedly superior to that of the same paint bodied with polymer in the absence of clay carrier (Part B).

EXAMPLE II

This example illustrates the synergistic effect of colloidal attapulgite clay and crosslinked acrylic acid polymer as thickening agents in hard water.

The partially neutralized crosslinked acrylic acid coated Attagel 30 of Example I was dispersed in tap water at the 5% level and the pH of the dispersion adjusted to 8.25 with a 28% solution of ammonia. The viscosity of the dispersion was measured with the Brookfield instrument at 10 r.p.m., 100 r.p.m. and again at 10 r.p.m. to determine the extent of high shear breakdown. The apparent viscosity values obtained in this manner were compared with (1) the viscosity of dispersions of various quantities of the same batch of Attagel 30 without coating and (2) the viscosity of an aqueous dispersion containing the same quantity of neutralized crosslinked acrylic acid polymer that had been used in coating the attapulgite clay. In all cases dispersions were prepared in a Waring Blendor by slowly adding the colloidal thickening agent to the liquid and mixing for 10 minutes at the low speed adjustment. The results are summarized in Table II.

Data in Table II show that 5% of the coated clay product of this invention resulted in an aqueous system which had about 20 times the high shear (100 r.p.m.) viscosity of the system obtained with the same amount of uncoated attapulgite clay and about 15 times the low shear viscosity of the same quantity of uncoated clay.

The data indicate that if the clay colloid and crosslinked acrylic acid polymer functioned independently, the viscosity of a 5% dispersion of the coated Attagel 30 containing 5% polymer would be about 700 cp. at 10 r.p.m. and about 154 cp. at 100 r.p.m. The observed viscosity of a 5% dispersion of the clay containing 5% polymer coating was about 10 times as great at high and low shear rates as would have been expected if the clay and polymer operated independently. Data in Table II show only 5% of the coated clay product was 160 cp. greater than the high shear viscosity of the tap water thickened with 10% of the uncoated clay. In other words, the coated clay was more than twice as effective as uncoated clay at high rates of shear.

All dispersions were made up with 5% coated clay in tap water by mixing the ingredients for 10 minutes at low speed in the Waring Blendor. The pH of the dispersions were then adjusted to 8.3–8.6 with 28% ammonia solution. Results are summarized in Table III.

Data in Table III show that the use of alkyl monoamines, especially alkanolamines, improved the thickening properties of the crosslinked acrylic acid polymer coated attapulgite clay and reduced the ratio of low shear to high shear viscosity of the thickened systems. In other words, systems containing clay, polymer and amine as the thickening agent were less thixotropic than systems containing clay and polymer without amine. Data in Table III indicate that an alkylene diamine had the opposite effect on the polymer coated attapulgite clay, i.e., ethylene diamine decreased high and low shear viscosity and had little effect on the thixotropy of the dispersion of the polymer coated clay.

TABLE III.—EFFECT OF AMINE ADDITIVE ON ATTAGEL 30 COATED WITH 10% (BASED ON M.F. WEIGHT OF CLAY) OF ACRYLIC ACID-POLYALLYL SUCROSE COPOLYMER

| Amine Additive to Polymer Coated Attapulgite Clay | Wt. Percent Amine (based on M.F. Attagel 30 Weight) | pH of 5% Dispersion | | Brookfield Viscosity of Neutralized Dispersion | | |
|---|---|---|---|---|---|---|
| | | Before Addition of NH₃ | After Addition of NH₃ | 10 r.p.m. | 100 r.p.m. | 10 r.p.m. |
| None | | 4.48 | 8.32 | 14,640 | 2,624 | 13,160 |
| Diethylamine | 1.17 | 4.60 | 8.60 | 27,500 | 6,020 | 29,000 |
| Mixed Isopropylamine | 2.40 | 4.80 | 8.30 | 18,100 | 2,860 | 14,600 |
| Monoethanolamine | 0.98 | 4.60 | 8.42 | 38,500 | 6,500 | 33,000 |
| Diethanolamine | 1.68 | 4.60 | 8.30 | 38,500 | 7,220 | 37,000 |
| n-Butylamine | 1.12 | 4.68 | 8.30 | 16,720 | 3,280 | 16,840 |
| Triethanolamine | 2.40 | 4.30 | 8.30 | 15,760 | 3,344 | 16,640 |
| Ethylene Diamine | 0.48 | 4.68 | 8.36 | 13,200 | 2,360 | 13,520 |

TABLE II.—VISCOSITY OF COLLOID THICKENED TAP WATER

| Colloidal Thickening Agent | Weight Percent Thickening Agent | Original pH of Aqueous Dispersion | pH of Dispersion After Adjustment with 28% NH₃ Solution | Viscosity, cp. (Brookfield) | | |
|---|---|---|---|---|---|---|
| | | | | 10 r.p.m. | 100 r.p.m. | 10 r.p.m. |
| Attagel 30 | 5.0 | 7.9 | | 500 | 72 | 520 |
| Do | 10.0 | 7.9 | | 8,800 | 1,300 | 8,500 |
| Crosslinked acrylic acid polymer | 0.25 | 4.4 | 8.6 | 200 | 82 | 200 |
| Attagel 30 coated with 5% crosslinked acrylic acid polymer and amine substantive agent (containing 0.25% by weight of polymer) | 5.0 | 6.0 | 8.3 | 7,500 | 1,400 | 7,200 |

EXAMPLE III

This example illustrates the necessity for employing an amine to neutralize partially the crosslinked acrylic acid polymer coated clay and shows also the effect of various amine neutralizing agents on the viscosity building properties of the polyallyl sucrose crosslinked acrylic acid polymer coated clay. In all instances, the F.M. of the coated clays was adjusted to 18% with water before addition of polymer to the clay and the amines, when used, were employed in amount calculated to neutralize about 20% of the free carboxy groups of the polymer (calculated on the basis of an equivalent weight of 75 for the copolymer). All coated clays were formulated in a Kitchen-Aid mixer using a wire cage agitator. Aqueous amine solution (or water when no amine was used) was added to Attagel 30 in the mixer and tumbled for 10 minutes. The powdered acrylic acid-polyallyl sucrose copolymer was added and mixed for 15 minutes. The composition was then passed through a high speed hammer mill using a 1/16" screen.

EXAMPLE VI

Still in accordance with this invention, 544 grams of a sample of Attagel 30 was tumbled in a rotating drum with lifter bars. A solution containing 48.3 grams water and 8.4 grams diethanolamine was sprayed into the tumbling clay and mixed for 10 minutes. Fifty grams of the finely divided acrylic acid-polyallyl sucrose copolymer was added and tumbled for 10 minutes. The batch was passed through a screen mill having a 0.027 inch screen and stored in a sealed jar.

EXAMPLE V

This example demonstrates the desirability of adjusting the F.M. of the crosslinked acrylic acid polymer coated attapulgite clay to a F.M. of approximately 18%.

Samples of extruded colloidal attapulgite clay (7.0% F.M.) were coated with 10.0% of the crosslinked polymer and 1.68% diethanolamine (all percentages based on the M.F. clay weight). All samples were coated by the tumbling procedure of the previous examples and the F.M. of the coated clay was controlled by adjustment of the concentration of the aqueous solution of triethanolamine which was added to the clay before addition of the copolymer. 5% aqueous dispersions of the coated clays were made up in tap water using a Waring Blendor at low speed for 10 minutes. The results are tabulated in Table IV.

Data in Table IV indicate (1) that the crosslinked acrylic acid polymer salt coating on the colloidal attapulgite clay was more than twice as effective at 100 r.p.m. and more than three times as effective at 10 r.p.m. when the coated clay was adjusted to 18% F.M. than when the F.M. of the coated clay was 9.5%. The data show also that the copolymer salt coated clay was more effective when the F.M. was adjusted to 18% than when the F.M. was adjusted to a level appreciably above 18%.

TABLE IV.—EFFECT OF PRODUCT F.M. ON VISCOSITY OF DISPERSIONS OF ATTAPULGITE CLAY COATED WITH ACRYLIC ACID-POLYALLYL SUCROSE COPOLYMER SALT

| Percent F.M. of Starting Clay | Percent F.M. Coated Clay | pH of 5% Aqueous Dispersion | | Neutralized Brookfield Viscosity, cp. | | |
| --- | --- | --- | --- | --- | --- | --- |
| | | Original | After Adjustment With NH₃ | 10 r.p.m. | 100 r.p.m. | 10 r.p.m. |
| 8.1 | (Uncoated) | 7.91 | ---------- | 1,976 | 267 | 2,020 |
| 8.1 | 18.0 | 4.80 | 8.60 | 78,400 | 15,960 | 74,400 |
| 8.1 | 9.5 | 4.90 | 8.44 | 23,400 | 6,350 | 23,400 |
| 7.2 | (Uncoated) | 7.78 | ---------- | 3,100 | 420 | 3,120 |
| 7.2 | 18.0 | 4.50 | 8.38 | 16,520 | 3,088 | 18,600 |
| 7.2 | 20.0 | 4.75 | 8.20 | 16,120 | 3,032 | 17,240 |
| 7.2 | 22.0 | 4.60 | 8.30 | 12,840 | 2,136 | 12,760 |

EXAMPLE VI

This example illustrates a form of the invention in which an organic solvent which is substantially inert towards the clay and polymer is used to adjust the F.M. of the amine-treated polymer coated clay.

Attagel 30 was mixed with a solution of triethanolamine in mineral spirits using 2.4% triethanolamine based on the M.F. weight of the clay. The clay was then tumbled with powdered crosslinked acrylic acid polymer in amount of 10%, based on the M.F. clay weight, and passed through a pulverizer with a herringbone screen. A 5% dispersion of the coated clay in tap water, prepared as in Example I and neutralized to a pH of 8.49 with 28% ammonia, had an apparent viscosity (Brookfield) of 43,500 cp. at 10 r.p.m. and 1,110 cp. at 100 r.p.m. A 5% dispersion in tap water of a sample of the clay before coating had an apparent viscosity of only 1,976 cp. at 10 r.p.m. and a viscosity of 267 cp. at 100 r.p.m.

I claim:

1. A solid particulate composition for thickening aqueous liquids comprising particles of colloidal attapulgite clay the surface of which is uniformly coated with a small amount of a colloidally dispersible polymer of acrylic acid crosslinked with from about 0.75% to about 2.0% by weight of polyallyl sucrose and a minor weight percent, as compared with the amount of said polymer, of a short chain alkyl amine.

2. The composition of claim 1 wherein said crosslinked copolymer is present in amount within the range of 2% to 12% of the moisture free clay weight and said polyallyl sucrose contains from 5 to 6 allyl groups per sucrose molecule.

3. The composition of claim 2 wherein said short chain alkyl amine is an alkyl monoamine having from 2 to 4 amine groups in a single alkyl group and is used in amount to neutralize up to about 20% of the free carboxy groups of said polymer.

4. The composition of claim 3 in which said alkyl monoamine is water soluble.

5. The composition of claim 2 in which said alkyl amine is a water-soluble alkanolamine present in amount sufficient to neutralize from about 10% to 20% of the free carboxy groups of said polymer.

6. The composition of claim 2 in which said solid particulate composition has a free moisture content of about 18%.

7. The composition of claim 6 in which water accounts substantially completely for the free moisture content thereof.

8. The composition of claim 6 in which water accounts for at least 7% of the free moisture content thereof and mineral spirits accounts for the remainder.

9. The composition of claim 6 in which said clay has never been dried to a free moisture content below about 7% and said clay is coated with from about 5% to 10% by weight, on a moisture free clay basis, of a colloidally dispersible copolymer of 98.6 to 99.0 parts by weight of acrylic acid and 1.0 to 1.4 parts by weight of a polyallyl sucrose having from 5 to 6 allyl groups per sucrose molecule and a water-soluble alkanolamine in amount sufficient to neutralize from about 1% to 20% of the free carboxy groups of said copolymer.

10. The composition of claim 9 in which said amine is present in amount sufficient to adjust the pH of a 5% aqueous dispersion of said clay coated with said copolymer to a value within the range of about 4.5 to about 5.0.

11. The composition of claim 9 wherein said copolymer is partially neutralized with said amine while in contact with said particles of attapulgite clay.

12. A method for thickening an aqueous liquid which comprises agitating said aqueous liquid with from about 2% to 10% by weight of the product of claim 1 thereby producing a fluid colloidal aqueous dispersion of the product of claim 1, and incorporating an inorganic monovalent base into said dispersion in amount sufficient to cause said dispersion to thicken.

13. A method for gelling an aqueous liquid containing dissolved $Ca^{++}$ which comprises agitating said liquid with from about 2% to 10% by weight of the product of claim 1 using sufficient high shear agitation to disperse said product in said liquid, and incorporating an inorganic monovalent base into said dispersion in amount sufficient to cause said dispersion to thicken, thereby to obviate the adverse effect of $Ca^{++}$ and the adverse effect of high shear agitation upon said polymer present in the product of claim 1 when in the absence of said attapulgite clay.

References Cited by the Examiner

UNITED STATES PATENTS 2,923,692  2/1960  Ackerman et al. _____ 260—17.4

OTHER REFERENCES

"Condensed Chemical Dictionary" Reinhold Publishers, 1956, p. 503.

WILLIAM H. SHORT, *Primary Examiner.*

J. NORRIS, *Assistant Examiner.*